(12) United States Patent (10) Patent No.: US 12,636,960 B2
Kanzaki et al. (45) Date of Patent: May 26, 2026

(54) BATTERY ELECTRIC VEHICLE

(71) Applicant: TOYOTA JIDOSHA KABUSHIKI KAISHA, Toyota (JP)

(72) Inventors: Kentaroh Kanzaki, Toyota (JP); Yoichiro Isami, Mishima (JP); Yusuke Furuhashi, Nagoya (JP); Naruto Yamane, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 31 days.

(21) Appl. No.: 18/972,297

(22) Filed: Dec. 6, 2024

(65) Prior Publication Data

US 2025/0214450 A1 Jul. 3, 2025

(30) Foreign Application Priority Data

Dec. 27, 2023 (JP) ................................ 2023-221111

(51) Int. Cl.
*B60L 15/20* (2006.01)
(52) U.S. Cl.
CPC ..... *B60L 15/2054* (2013.01); *B60L 2240/486* (2013.01); *B60L 2240/507* (2013.01); *B60L 2250/26* (2013.01)
(58) Field of Classification Search
CPC ........... B60L 15/2054; B60L 2240/486; B60L 2240/507; B60L 2250/26; B60L 2240/421; B60L 2240/423; B60L 2240/48; B60L 15/20; B60L 2240/12; B60W 2050/0039; B60W 2050/004;
B60W 2050/0041; B60W 2520/10; B60W 2540/10; B60W 2710/083; B60W 10/08; B60W 2540/16; B60K 20/02
See application file for complete search history.

(56) References Cited

U.S. PATENT DOCUMENTS

| | | | |
|---|---|---|---|
| 12,319,148 B2 * | 6/2025 | Ikezawa | .................. B60L 15/20 |
| 2012/0083958 A1 * | 4/2012 | Ballard | ................. B60W 50/10 |
| | | | 701/56 |
| 2021/0387530 A1 * | 12/2021 | Oh | ...................... F16H 61/0213 |

(Continued)

FOREIGN PATENT DOCUMENTS

| | | |
|---|---|---|
| DE | 10 2021 124 861 A1 | 3/2022 |
| JP | 2022-030838 A | 2/2022 |

*Primary Examiner* — Robert T Nguyen
(74) *Attorney, Agent, or Firm* — Finnegan, Henderson, Farabow, Garrett and Dunner, LLP

(57) ABSTRACT

A battery electric vehicle includes an electric motor as a driving source. The battery electric vehicle includes: an accelerator pedal; a pseudo shifter imitating a shifter that is used to perform a shifting operation of a manual transmission internal combustion engine vehicle; and a control device configured to change a relationship among a vehicle speed of the battery electric vehicle, an accelerator operation amount of the accelerator pedal, and torque of the electric motor in response to an operation of the pseudo shifter. The control device includes a memory storing a vehicle model that models a virtual vehicle, and a processing circuit coupled to the memory and configured to execute the vehicle model. The vehicle model includes an engine model that models a virtual internal combustion engine, a clutch model that models a virtual clutch, a transmission model that models a virtual manual transmission, and a driver model.

2 Claims, 7 Drawing Sheets

(56)                References Cited

U.S. PATENT DOCUMENTS

| 2022/0041062 | A1 |   | 2/2022 | Nishimine et al. |
| 2022/0041157 | A1* |   | 2/2022 | Imamura ............... B60W 10/06 |
| 2024/0181893 | A1* |   | 6/2024 | Oh .......................... B60L 15/20 |

* cited by examiner

BATTERY ELECTRIC VEHICLE

CROSS-REFERENCE TO RELATED APPLICATION

This application claims priority to Japanese Patent Application No. 2023-221111 filed on Dec. 27, 2023, incorporated herein by reference in its entirety.

BACKGROUND

1. Technical Field

The present disclosure relates to battery electric vehicles including an electric motor as a driving source.

2. Description of Related Art

Japanese Unexamined Patent Application Publication No. 2022-030838 (JP 2022-030838 A) discloses a battery electric vehicle that can simulate manual shifting of a vehicle equipped with a manual transmission and powered by an internal combustion engine (hereinafter referred to as "manual transmission internal combustion engine vehicle") by controlling an electric motor. The battery electric vehicle disclosed in this publication includes a vehicle model that simulates a manual transmission internal combustion engine vehicle, and a driver model that simulates an exemplary driver. The vehicle model includes an engine model, a clutch model, and a manual transmission model. The driver model calculates the amount of depression of a clutch pedal of a virtual clutch simulated by the clutch model, based on the rotational speed difference between the rotational speed of an input shaft of a virtual manual transmission simulated by the manual transmission model and the virtual engine rotational speed simulated by the engine model.

In the battery electric vehicle disclosed in the above publication, the driver can perform a shifting operation with an accelerator pedal depressed. However, since the virtual clutch is disengaged in response to the shifting operation, the virtual engine rotational speed increases suddenly. In the case where a pseudo tachometer configured to display the virtual engine rotation speed is installed on, for example, an instrument panel of the vehicle, the driver feels uncomfortable when the virtual engine rotational speed displayed on the pseudo tachometer increases suddenly.

In the battery electric vehicle disclosed in the above publication, the virtual clutch will not be engaged unless the rotational speed difference calculated by the driver model is reduced. Therefore, when the driver performs a shifting operation with the accelerator pedal depressed, shifting will not be completed because the rotational speed difference increases due to the increase in virtual engine rotational speed. During this time, the battery electric vehicle simulates the behavior of the manual transmission internal combustion engine vehicle with the clutch disengaged. Therefore, the longer it takes to complete shifting, the more uncomfortable the driver feels.

SUMMARY

The present disclosure provides a battery electric vehicle that can simulate shifting of a manual transmission internal combustion engine vehicle, and that is configured to complete shifting without making a driver feel uncomfortable even when the driver performs a shifting operation with an accelerator pedal depressed.

A battery electric vehicle according to an embodiment of the present disclosure is a battery electric vehicle that includes an electric motor as a driving source. The battery electric vehicle includes: an accelerator pedal; a pseudo shifter imitating a shifter that is used to perform a shifting operation of a manual transmission internal combustion engine vehicle; and a control device configured to change a relationship among a vehicle speed of the battery electric vehicle, an accelerator operation amount of the accelerator pedal, and torque of the electric motor in response to an operation of the pseudo shifter. The control device includes a memory storing a vehicle model that models a virtual vehicle, and a processing circuit coupled to the memory and configured to execute the vehicle model.

The vehicle model includes an engine model that models a virtual internal combustion engine, a clutch model that models a virtual clutch, a transmission model that models a virtual manual transmission, and a driver model that models an exemplary driver. The driver model is a model configured to calculate a virtual accelerator operation amount of the virtual internal combustion engine, a virtual clutch operation amount of the virtual clutch, and a virtual gear stage of the virtual manual transmission, based on the accelerator operation amount of the accelerator pedal, a shift position of the pseudo shifter, the vehicle speed of the battery electric vehicle, and a virtual engine rotational speed of the virtual internal combustion engine.

The driver model is configured to change the virtual accelerator operation amount from a requested operation amount to a fully closed operation amount in response to a change in the shift position caused by the operation of the pseudo shifter. The requested operation amount means the accelerator operation amount that the driver requests by operating the accelerator pedal. The driver model is configured to change the virtual clutch operation amount from an engaged operation amount to a disengaged operation amount in response to completion of the change in the virtual accelerator operation amount to the fully closed operation amount. The driver model is configured to change the virtual gear stage to a requested gear stage corresponding to the changed shift position in response to completion of the change in the virtual clutch operation amount to the disengaged operation amount, The driver model is configured to, after the virtual gear stage is changed to the requested gear stage, change the virtual clutch operation amount from the disengaged operation amount to the engaged operation amount in response to a rotational speed difference between the virtual engine rotational speed and a virtual input shaft rotational speed of the virtual manual transmission converging within a predetermined range. The driver model is configured to change the virtual accelerator operation amount from the fully closed operation amount to the requested operation amount in response to completion of the change in the virtual clutch operation amount to the engaged operation amount.

The driver model may be configured to, when the operation of the pseudo shifter is a downshift operation, temporarily increase the virtual accelerator operation amount from the fully closed operation amount in response to completion of the change in the virtual gear stage to the requested gear stage. The driver model may be configured to change the virtual clutch operation amount from the disengaged operation amount to the engaged operation amount in response to the rotational speed difference between the virtual engine rotational speed and the virtual input shaft rotational speed of the virtual manual transmission converging within the predetermined range.

In the battery electric vehicle according to the embodiment of the present disclosure, the virtual accelerator operation amount of the virtual internal combustion engine is changed from the requested operation amount to the fully closed operation amount in response to the change in the shift position caused by the operation of the pseudo shifter. Therefore, the virtual engine rotational speed will not increase in response to the operation of the accelerator pedal by the driver, and the rotational speed difference between the virtual engine rotational speed and the virtual input shaft rotational speed of the virtual manual transmission will quickly converge within the predetermined range. Accordingly, even when the driver performs a shifting operation with the accelerator pedal depressed, shifting can be completed without making the driver feel uncomfortable.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

1. Configuration of Power System of Battery Electric Vehicle

Figure 1:
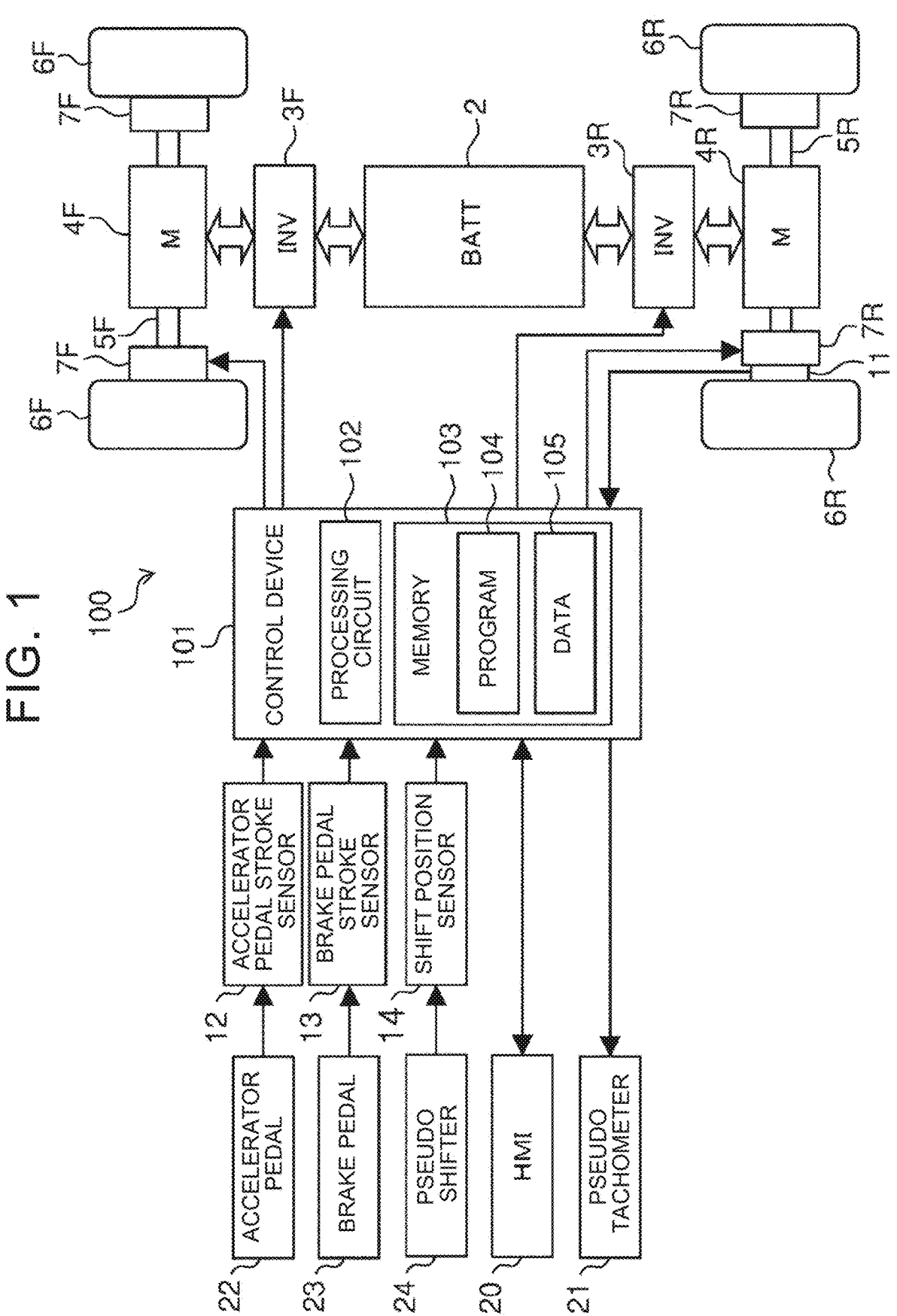
FIG. 1 shows the configuration of a battery electric vehicle according to an embodiment of the present disclosure.

FIG. 1 schematically shows the configuration of a battery electric vehicle 100 according to an embodiment of the present disclosure. First, the configuration of a power system of the battery electric vehicle 100 will be described with reference to FIG. 1.

The battery electric vehicle 100 includes two electric motors (M) 4F, 4R at the front and rear as traction power sources. The electric motors 4F, 4R are, for example, three-phase alternating current (AC) motors. The front electric motor 4F is connected to front drive shafts 5F that drive front wheels 6F. The rear electric motor 4R is connected to rear drive shafts 5R that drive rear wheels 6R. The front wheels 6F are suspended on electronically controlled right and left front suspensions 7F that are independent of each other. The rear wheels 6R are suspended on electronically controlled right and left rear suspensions 7R that are independent of each other.

The front electric motor 4F and the rear electric motor 4R are equipped with inverters (INVs) 3F, 3R, respectively. The front inverter 3F and the rear inverter 3R are each connected to a battery (BATT) 2. That is, the battery electric vehicle 100 is a battery electric vehicle (BEV) that runs on the electrical energy stored in the battery 2. The inverters 3F, 3R are, for example, voltage inverters, and control the torque of the electric motors 4F, 4R, respectively, by pulse width modulation (PWM) control.

2. Configuration of Control System of Battery Electric Vehicle

Next, the configuration of a control system of the battery electric vehicle 100 will be described with reference to FIG. 1.

The battery electric vehicle 100 includes a vehicle speed sensor 11. At least one of wheel speed sensors, not shown, mounted on the right and left front wheels 6F and the right and left rear wheels 6R is used as the vehicle speed sensor 11. The battery electric vehicle 100 also includes an accelerator pedal stroke sensor 12. The accelerator pedal stroke sensor 12 is provided for an accelerator pedal 22, and outputs a signal indicating the amount of depression of the accelerator pedal 22, i.e., the accelerator operation amount. The battery electric vehicle 100 further includes a brake pedal stroke sensor 13. The brake pedal stroke sensor 13 is provided for a brake pedal 23, and outputs a signal indicating the amount of depression of the brake pedal 23, that is, the brake operation amount.

The accelerator pedal 22 and the brake pedal 23 are driving operation members that are used to drive the battery electric vehicle 100. In addition to these driving operation members, the battery electric vehicle 100 includes a pseudo shifter 24 imitating a shifter that is used to perform shifting operations of a manual transmission internal combustion engine vehicle. The pseudo shifter 24 may be a pseudo sequential shifter imitating a sequential shifter such as a paddle shifter, or may be a pseudo H-shifter imitating an H-shifter. It is herein assumed that the pseudo shifter 24 is a pseudo paddle shifter imitating a paddle shifter.

The pseudo shifter 24 has a structure imitating shift paddles attached to a steering wheel or a steering shaft, and allows to move right and left paddles independently of each other. The pseudo shifter 24 is provided with a shift position sensor 14. The shift position sensor 14 outputs an upshift signal when the right paddle is pulled, and outputs a downshift signal when the left paddle is pulled.

The battery electric vehicle 100 further includes a human-machine interface (HMI) 20 as an interface with a driver, and a pseudo tachometer 21. The HMI 20 includes a touch panel display. The HMI 20 displays information on the touch panel display, and receives inputs from the driver through touch operations on the touch panel display. The pseudo tachometer 21 displays a virtual engine rotational speed, which will be described later, to the driver.

The battery electric vehicle 100 further includes a control device 101. Sensors and devices to be controlled that are mounted on the battery electric vehicle 100 are connected to the control device 101 via an in-vehicle network. In addition to the vehicle speed sensor 11, the accelerator pedal stroke sensor 12, the brake pedal stroke sensor 13, and the shift position sensor 14, various other sensors are mounted on the battery electric vehicle 100.

The control device 101 is typically an electronic control unit (ECU). The control device 101 may be a combination of a plurality of ECUs. The control device 101 includes at least a processing circuit 102 and a memory 103. For example, the processing circuit 102 may be a central processing unit (CPU) or a combination of a CPU and a field-programmable gate array (FPGA). The memory 103 includes a random access memory (RAM) for temporarily recording data, and a read-only memory (ROM) for storing a program 104 that is executable by the processing circuit 102 and various types of data 105 related to the program.

The memory 103 may be contained in the processing circuit 102. The program 104 is composed of a plurality of instruction codes. The processing circuit 102 reads the program 104 and the data 105 from the memory 103, executes the program 104, and generates control signals based on signals acquired from the sensors. The control device 101 may include one processing circuit 102, or may include a plurality of processing circuit 102.

3. Functions of Control Device 3-1. Control Mode

The control device 101 can control the battery electric vehicle 100 in various control modes. The driver can select a control mode himself/herself by performing a touch operation on the touch panel display of the HMI 20. Specifically, when a touch operation is performed on the touch panel display of the HMI 20, one or more programs 104 associated with that touch operation are read from the memory 103 and executed by the processing circuit 102.

The control modes that are selectable via the HMI 20 include an automatic mode and a manual mode. The automatic mode is a control mode in which the battery electric vehicle 100 is driven as a normal BEV. In the automatic mode, the driver can basically drive the battery electric vehicle 100 only by operating the accelerator pedal 22, the brake pedal 23, and the steering wheel, not shown. In the automatic mode, shift operations of the pseudo shifter 24 are disabled. The manual mode is a control mode in which the battery electric vehicle 100 is operated like a manual transmission internal combustion engine vehicle. In the manual mode, the operation when the gear ratio of a manual transmission is changed is replicated by a shift operation of the pseudo shifter 24.

3-2. Vehicle Model

The control device 101 functions as a torque control device when the processing circuit 102 executes one or more torque control programs 104 stored in the memory 103. A control mode signal is input from the HMI 20 to the control device 101 that functions as a torque control device. The control mode signal includes information on the control mode selected by the driver. When the control mode is switched to the manual mode, the control device 101 calculates drive wheel torque to be generated by drive wheels using a vehicle model, and generates a motor torque command value to be given to the inverters 3F, 3R based on the drive wheel torque.

Figure 2:
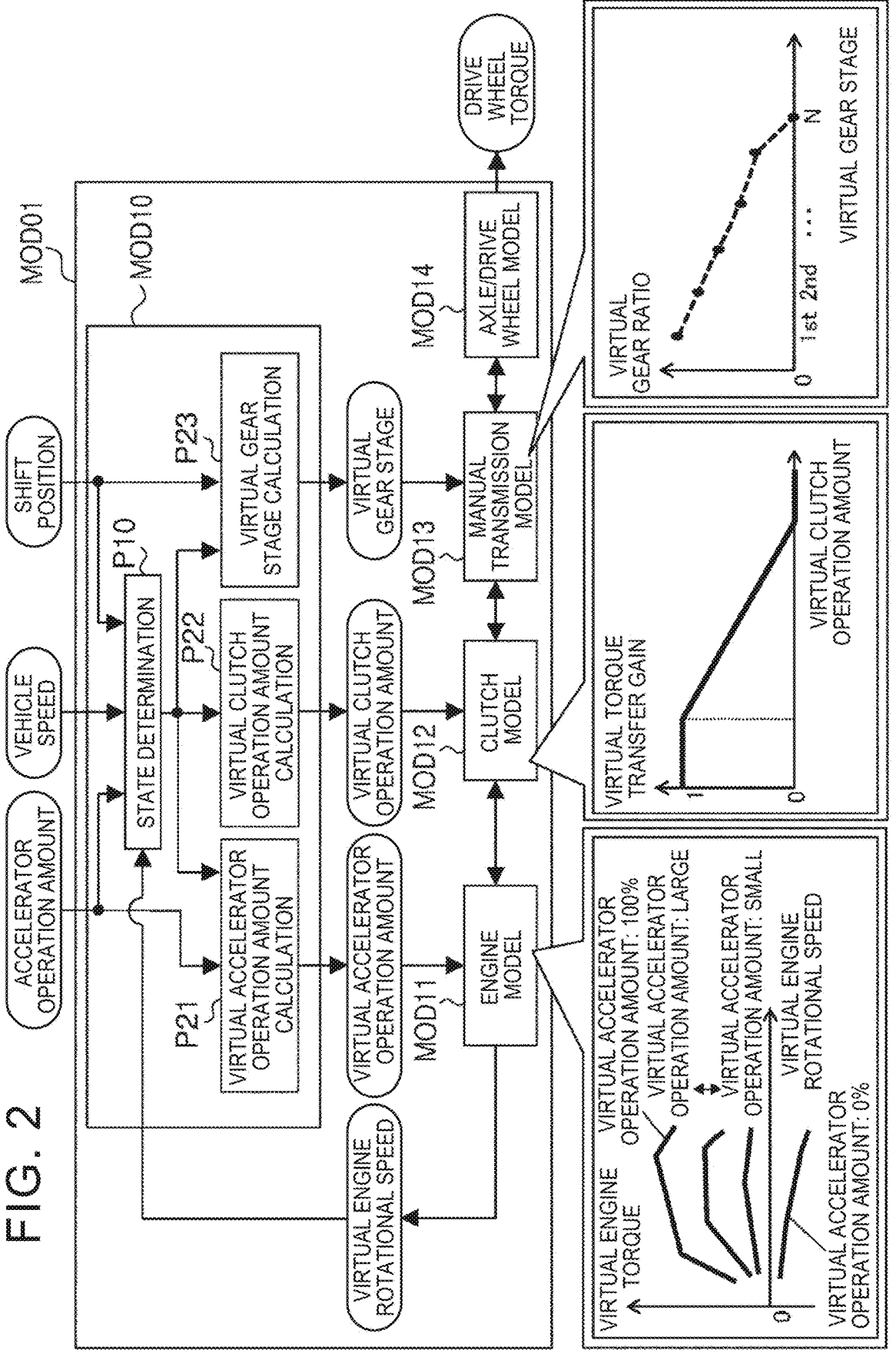
FIG. 2 shows the configuration of a vehicle model included in a control device.

FIG. 2 shows the configuration of a vehicle model MOD01 included in the control device 101. The vehicle model MOD01 is composed of a driver model MOD10, an engine model MOD11, a clutch model MOD12, a manual transmission model MOD13, and an axle/drive wheel model MOD14. An internal combustion engine virtually implemented by the vehicle model MOD01 will be referred to as "virtual internal combustion engine." A clutch virtually implemented by the vehicle model MOD01 will be referred to as "virtual clutch." A manual transmission virtually implemented by the vehicle model MOD01 will be referred to as "virtual manual transmission." A manual transmission internal combustion engine vehicle virtually implemented by a collection of these will be referred to as "virtual vehicle."

The engine model MOD11 models the virtual internal combustion engine. The clutch model MOD12 models the virtual clutch. The manual transmission model MOD13 models the virtual manual transmission. The axle/drive wheel model MOD14 models a virtual torque transmission system from an axle to the drive wheels. The driver model MOD10 models an exemplary driver. The exemplary driver is an experienced driver who is used to driving a manual transmission internal combustion engine vehicle. The driver model MOD10 can also be said to be a model of a virtual powertrain control unit (PCU) that integrally controls the virtual internal combustion engine, the virtual clutch, and the virtual manual transmission. The calculation results are transferred between the models.

The engine model MOD11 calculates a virtual engine rotational speed. The virtual engine rotational speed is calculated using different calculation methods depending on whether the virtual clutch is in an engaged state or a disengaged state. When the virtual clutch is in the engaged state, the virtual engine rotational speed is calculated from the vehicle speed, the virtual overall reduction ratio, and the slip ratio of the virtual clutch. The vehicle speed is acquired from a signal from the vehicle speed sensor 11. The virtual overall reduction ratio is a numerical value obtained by multiplying the virtual gear ratio of the virtual manual transmission by a virtual reduction ratio determined by the mechanical structure from the virtual manual transmission to the drive wheels. When the virtual clutch is in the disengaged state, the virtual engine rotational speed is calculated using a virtual accelerator operation amount and a virtual moment of inertia of the virtual internal combustion engine. For example, virtual engine torque may be calculated from the current virtual engine rotational speed and the current virtual accelerator operation amount, and the amount of change in virtual engine rotational speed after a unit time may be calculated based on the virtual engine torque and the virtual moment of inertia.

The engine model MOD11 calculates the virtual engine torque. The virtual engine torque is calculated from the virtual engine rotational speed and the virtual accelerator operation amount using a map such as that shown by the graph in FIG. 2. The virtual accelerator operation amount is calculated by the driver model MOD10. The engine model MOD11 defines the relationship between the virtual engine rotational speed and the virtual engine torque for each virtual accelerator operation amount. The virtual engine torque is input from the engine model MOD11 to the clutch model MOD12.

The clutch model MOD12 calculates a virtual torque transfer gain. The virtual torque transfer gain is a gain for calculating the degree of torque transfer of the virtual clutch. The virtual torque transfer gain is calculated from a virtual clutch operation amount using a map such as that shown by the graph in FIG. 2. The virtual clutch operation amount is calculated by the driver model MOD10. When the virtual clutch is in the engaged state, the clutch model MOD12 calculates virtual clutch torque using the virtual torque transfer gain. The virtual clutch torque is input from the clutch model MOD12 to the manual transmission model MOD13.

The manual transmission model MOD13 calculates the virtual gear ratio. The virtual gear ratio is a gear ratio determined by a virtual gear stage in the virtual manual transmission. The virtual gear ratio is calculated from the virtual gear stage using a map such as that shown by the graph in FIG. 2. The virtual gear stage is calculated by the driver model MOD10. The manual transmission model MOD13 calculates virtual transmission torque using the virtual gear ratio and the virtual clutch torque. The virtual transmission torque is input from the manual transmission model MOD13 to the axle/drive wheel model MOD14.

The axle/drive wheel model MOD14 calculates the drive wheel torque. The drive wheel torque is calculated using the virtual transmission torque and the virtual reduction ratio from the virtual manual transmission to the drive wheels. The drive wheel torque is the sum of the torques that are applied to the right and left front wheels 6F and the right and left rear wheels 6R. Torque to be generated by the front electric motor 4F is calculated by multiplying the drive wheel torque by the torque distribution rate to the front wheels 6F and the reduction ratio from an output shaft of the front electric motor 4F to the front wheels 6F. Torque to be generated by the rear electric motor 4R is calculated by multiplying the drive wheel torque by the torque distribution rate to the rear wheels 6R and the reduction ratio from an output shaft of the rear electric motor 4R to the rear wheels 6R.

The driver model MOD 10 calculates the virtual accelerator operation amount of the virtual internal combustion engine, the virtual clutch operation amount of the virtual clutch, and the virtual gear stage of the virtual manual transmission. In order to calculate these virtual operation amounts, the driver model MOD10 performs a state determination process P10, a virtual accelerator operation amount calculation process P21, a virtual clutch operation amount calculation process P22, and a virtual gear stage calculation process P23.

In the state determination process P10, the vehicle state and shift state of the virtual vehicle are determined. The state determination process P10 will be described in detail later. The shift state determined in the state determination process P10 is used in the virtual accelerator operation amount calculation process P21, the virtual clutch operation amount calculation process P22, and the virtual gear stage calculation process P23.

In the virtual accelerator operation amount calculation process P21, the virtual accelerator operation amount is calculated based on the accelerator operation amount obtained by the accelerator pedal stroke sensor 12 and the shift state of the virtual vehicle determined in the state determination process P10. The accelerator operation amount obtained by the accelerator pedal stroke sensor 12 represents the magnitude of a torque request for the electric motors 4F, 4R. The virtual accelerator operation amount represents the magnitude of a torque request for the virtual internal combustion engine of the virtual vehicle. The virtual accelerator operation amount calculation process P21 can be said to be a process of correcting the accelerator operation amount obtained by the accelerator pedal stroke sensor 12 for the virtual internal combustion engine. The virtual accelerator operation amount calculated in the virtual accelerator operation amount calculation process P21 is input to the engine model MOD11.

In the virtual clutch operation amount calculation process P22, the virtual clutch operation amount is calculated based on the shift state of the virtual vehicle determined in the state determination process P10. The virtual clutch operation amount is basically set to 0%. That is, the basic state of the virtual clutch is the engaged state. When an upshift signal or a downshift signal is input from the shift position sensor 14, the virtual clutch operation amount is temporarily set to 100%. This means that the virtual clutch is temporarily disengaged when a shift operation of the pseudo shifter 24 is performed. The virtual clutch operation amount calculated in the virtual clutch operation amount calculation process P22 is input to the clutch model MOD12.

In the virtual gear stage calculation process P23, the virtual gear stage is calculated based on the shift position obtained by the shift position sensor 14 and the shift state of the virtual vehicle determined in the state determination process P10. The number of virtual gear stages is the sum of the number of positions of the pseudo shifter 24 and neutral. The virtual gear stage calculated in the virtual gear stage calculation process P23 is input to the manual transmission model MOD13.

Figure 3:
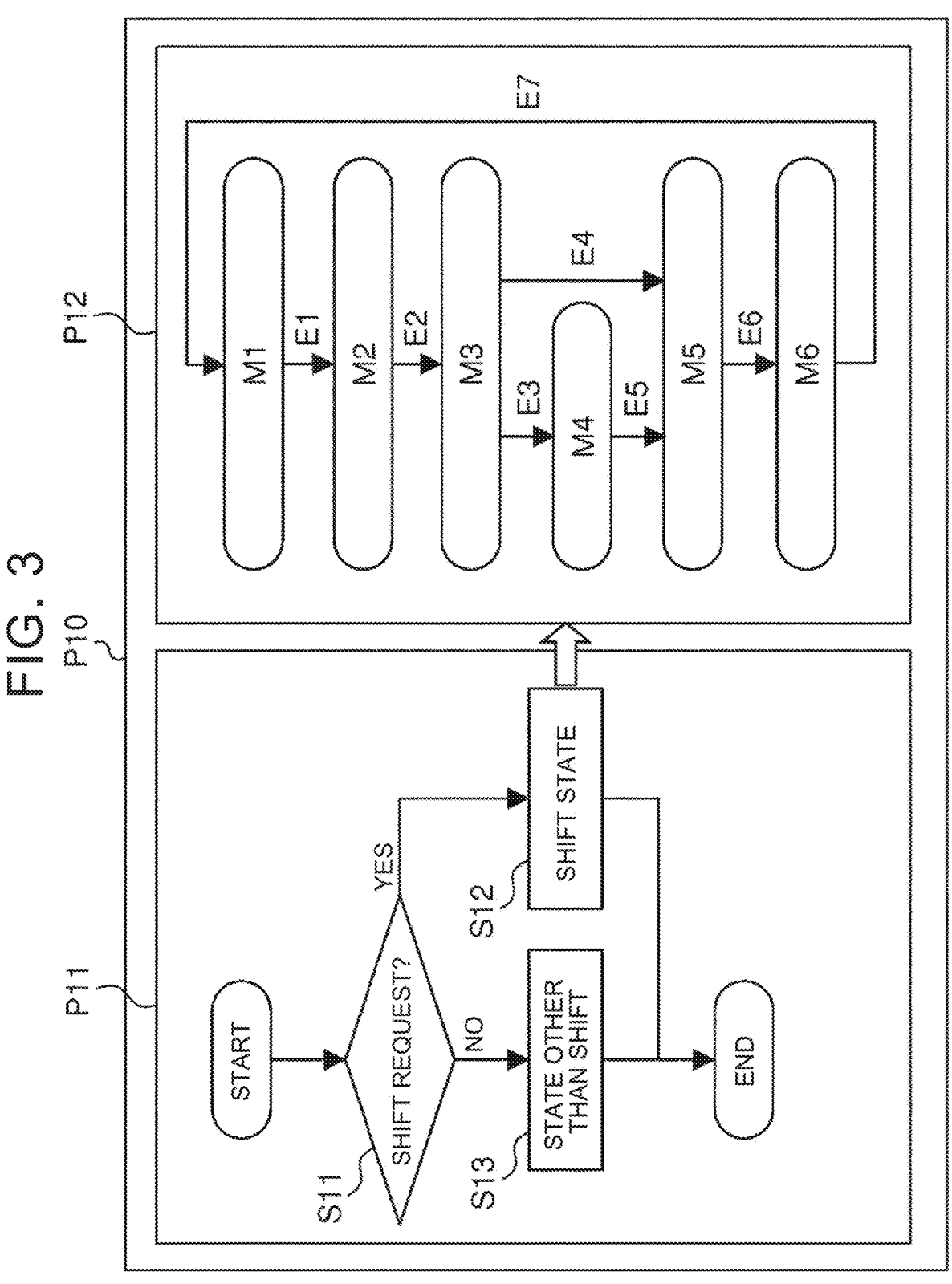
FIG. 3 illustrates a state determination process that is performed by a driver model.

FIG. 3 illustrates the state determination process P10. The state determination process P10 includes a vehicle state determination process P11 and a shift state determination process P12. Of these two processes P11, P12, a main process is the vehicle state determination process P11. When a predetermined condition is satisfied in the vehicle state determination process P11, the shift state determination process P12 is performed.

In the vehicle state determination process P11, steps S11, S12, and S13 are performed. In step S11, it is determined whether there is a shift request from the driver. When an upshift signal or a downshift signal is input from the shift position sensor 14, it is determined that the driver is requesting shifting. In response to a shift request from the driver, shifting is started, and a shifting flag indicating that the virtual vehicle is shifting is switched from OFF to ON.

When it is determined that there is a shift request from the driver, it is determined in step S12 that the virtual vehicle is in the shift state. When it is determined that there is no shift request from the driver, it is determined in step S13 that the virtual vehicle is in a state other than the shift state. The state other than the shift state includes, for example, a state in which the pseudo shifter 24 is not being operated. When it is determined that the virtual vehicle is in the shift state, the shift state determination process P12 is performed.

In the shift state determination process P12, it is determined which shift state the virtual vehicle is in. The shift state includes six states from a shift state M1 to a shift state M6. Transition conditions between these shift states include seven conditions, namely a transition condition E1 to a transition condition E7. M1 to M6 will be referred to as "shift state identifications (IDs)," and E1 to E7 will be referred to as "transition condition IDs."

In the shift state M1, the virtual accelerator operation amount is changed from an accelerator operation amount requested by the driver to zero. The accelerator operation amount requested by the driver is the accelerator operation amount obtained by the accelerator pedal stroke sensor 12. The transition condition E1 from the shift state M1 to the shift state M2 is that the virtual accelerator operation amount becomes zero. In the shift state M2, the virtual clutch is disengaged. That is, the virtual clutch operation amount is changed to 100%. The transition condition E2 from the shift state M2 to the shift state M3 is that the disengagement of the virtual clutch is completed. In the shift state M3, the virtual gear stage is changed to the virtual gear stage corresponding to the shift position after the shift operation. This change in virtual gear stage is made via neutral.

When the change in virtual gear stage is an upshift, the shift state M3 directly transitions to the shift state M5. The transition condition E4 from the shift state M3 to the shift state M5 is that the rotational speed difference between the virtual engine rotational speed and the virtual input shaft rotational speed falls within a predetermined range. When the change in virtual gear stage is a downshift, the shift state M3 transitions to the shift state M5 via the shift state M4. The transition condition E3 from the shift state M3 to the shift state M4 is that a gear shift to the changed virtual gear stage is completed. In the shift state M4, the virtual engine rotational speed and the virtual input shaft rotational speed of the virtual manual transmission are synchronized. The transition condition E5 from the shift state M4 to the shift state M5 is that the rotational speed difference between the virtual engine rotational speed and the virtual input shaft rotational speed falls within a predetermined range. However, setting of the manual mode may be changed by operating the HMI 20 so that the shift state M3 can directly transition to the shift state M5 even when the change in virtual gear stage is a downshift.

In the shift state M5, the virtual clutch is engaged. That is, the virtual clutch operation amount is changed to 0%. The transition condition E6 from the shift state M5 to the shift state M6 is that the engagement of the virtual clutch is completed. In the shift state M6, the virtual accelerator operation amount is returned to the accelerator operation amount requested by the driver, that is, the accelerator operation amount obtained by the accelerator pedal stroke sensor 12. The transition condition E7 from the shift state M6 to the shift state M1 is that the virtual accelerator operation amount increases to the accelerator operation amount requested by the driver.

Figure 4:
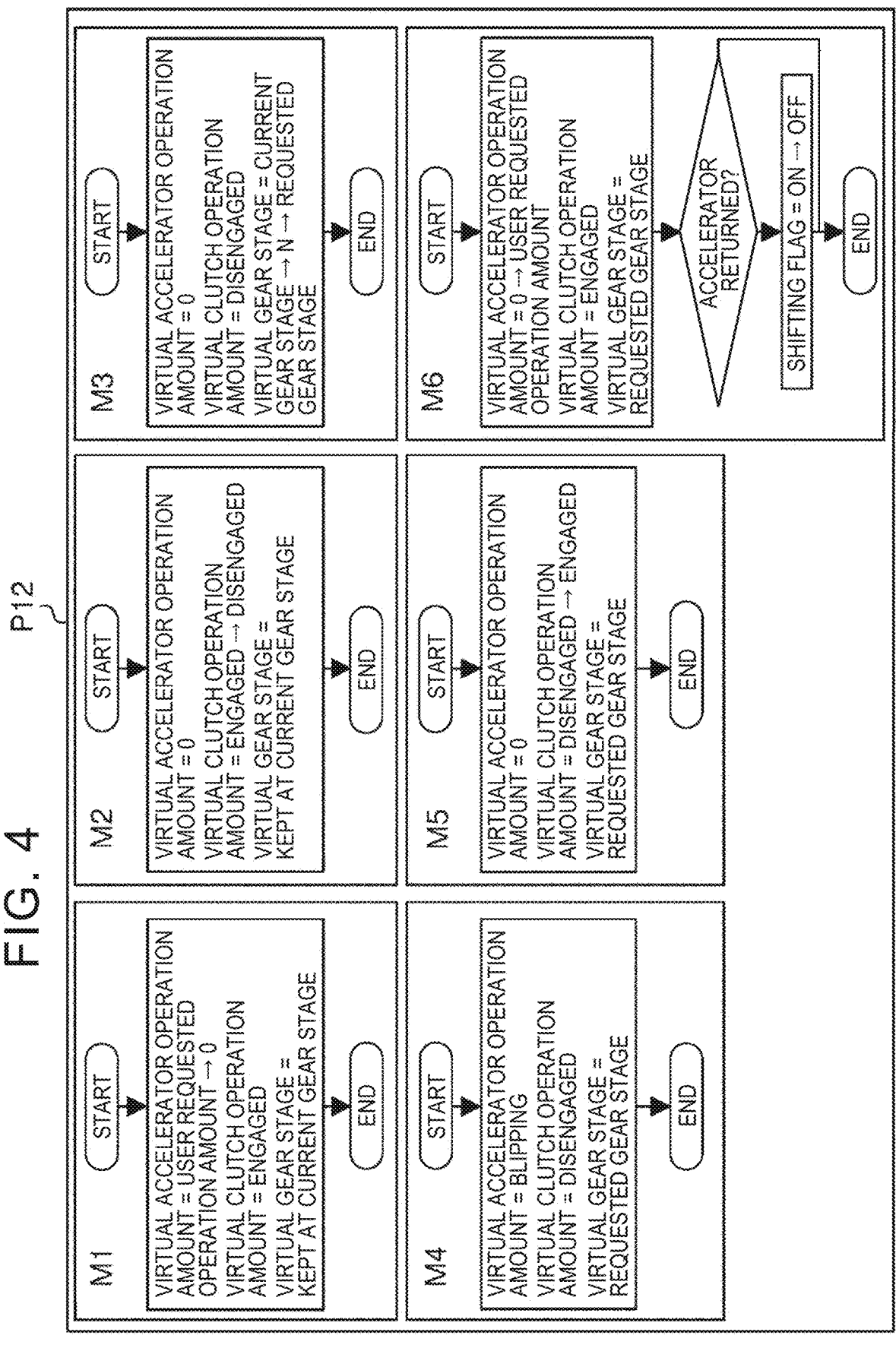
FIG. 4 illustrates details of the shift state determination process that is performed by the driver model.

FIG. 4 illustrates details of the shift state determination process P12 for each shift state ID. Each of the shift states M1 to M6 can be represented by the virtual accelerator operation amount, the virtual clutch operation amount, and the virtual gear stage.

In the shift state M1, the virtual accelerator operation amount is changed at a predetermined rate of change from the operation amount requested by the driver (user requested operation amount) to 0% that is a fully closed operation amount, namely an operation amount corresponding to a fully closed state. The virtual clutch operation amount is set to an engaged operation amount, namely an operation amount corresponding to the engaged state. The virtual gear stage is kept at the current gear stage.

In the shift state M2, the virtual accelerator operation amount is set to 0%. The virtual clutch operation amount is changed from the engaged operation amount to a disengaged operation amount, namely an operation amount corresponding to the disengaged state, at a predetermined rate of change. The virtual gear stage is kept at the current gear stage.

In the shift state M3, the virtual accelerator operation amount is set to 0%. The virtual clutch operation amount is set to the disengaged operation amount. The virtual gear stage is first changed from the current gear stage to neutral, and then changed to the gear stage requested by the driver.

In the shift state M4, blipping is performed to temporarily increase the virtual accelerator operation amount to increase the virtual engine rotational speed. The virtual clutch operation amount is set to the disengaged operation amount. The virtual gear stage is set to the requested gear stage.

In the shift state M5, the virtual accelerator operation amount is set to 0%. The virtual clutch operation amount is changed from the disengaged operation amount to the engaged operation amount at a predetermined rate of change. The virtual gear stage is set to the requested gear stage.

In the shift state M6, the virtual accelerator operation amount is changed from 0% to the user requested operation amount at a predetermined rate of change. The virtual clutch operation amount is set to the engaged operation amount. The virtual gear stage is set to the requested gear stage. When the virtual accelerator operation amount is returned to the accelerator operation amount requested by the driver, the flag indicating that the virtual vehicle is shifting is switched from ON to OFF.

The virtual accelerator operation amount calculation process P21 is performed according to the state of the virtual accelerator operation amount defined by each of the shift states M1 to M6 as described above. The virtual clutch operation amount calculation process P22 is performed according to the state of the virtual clutch operation amount defined by each of the shift states M1 to M6. The virtual gear stage calculation process P23 is performed according to the state of the virtual gear stage defined by each of the shift states M1 to M6.

4. Specific Examples of Shift Control 4-1. Shift Control during Upshift

A specific example of shift control that is performed by the control device 101 during an upshift will be described with reference to FIG. 5. The timing chart shown in FIG. 5 shows, together with the shift state IDs and the transition condition IDs, the upshift signal, the virtual accelerator operation amount, the virtual clutch operation amount, the virtual gear stage, the virtual engine rotational speed, the drive wheel torque requested for the electric motors 4F, 4R, and the change over time in longitudinal acceleration that is generated in the battery electric vehicle 100.

Figure 5:
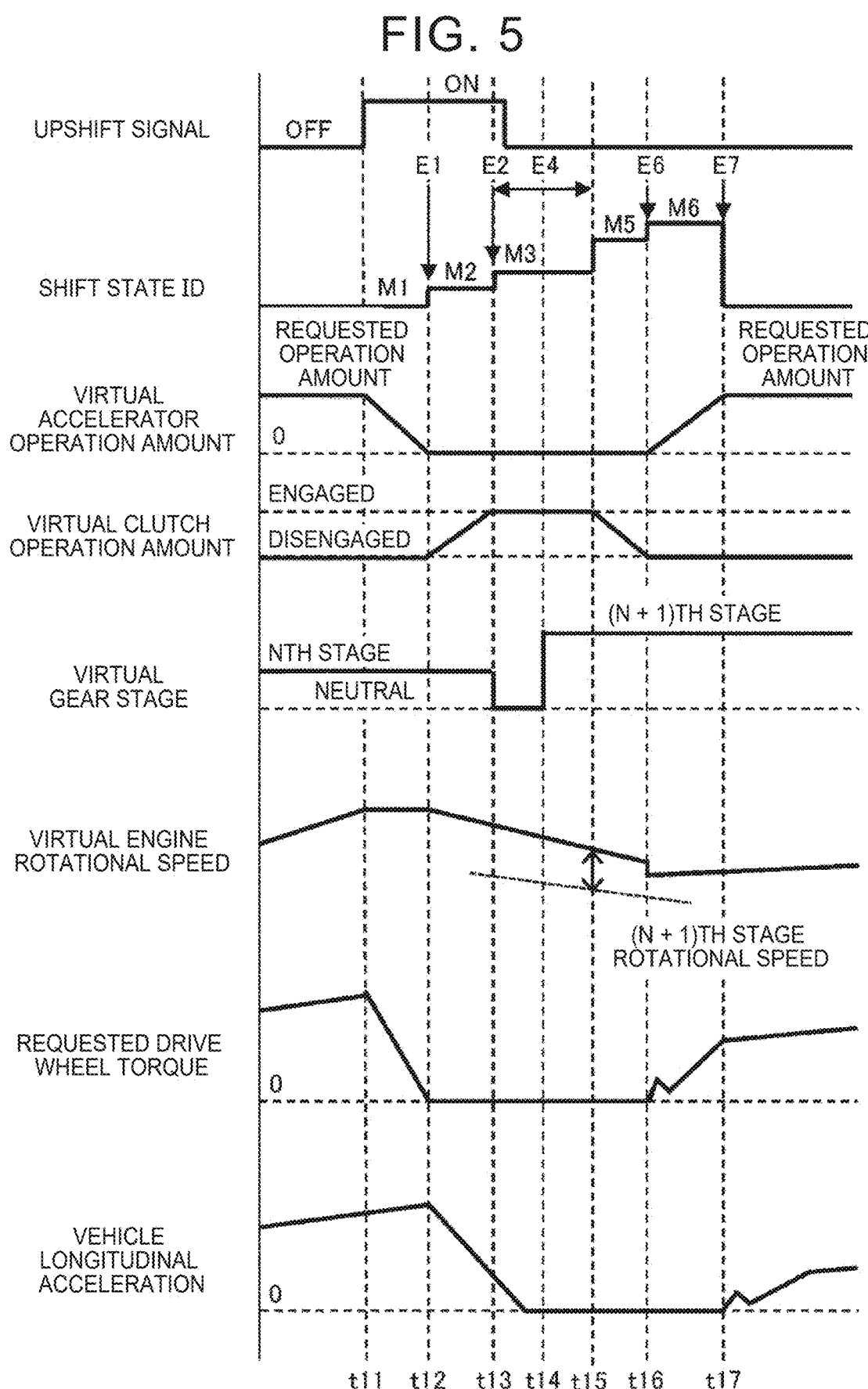
FIG. 5 shows a specific example of shift control that is performed by the control device during an upshift.

According to the timing chart shown in FIG. 5, the upshift signal is input from the shift position sensor 14 to the control device 101 at time t11. In response to the input of the upshift signal, the virtual accelerator operation amount is changed from the user requested operation amount to 0% at a predetermined rate of change. During this time, the virtual clutch operation amount is kept at the engaged operation amount, and the virtual gear stage is kept at the current Nth stage. Since the virtual accelerator operation amount, the virtual clutch operation amount, and the virtual gear stage are calculated in this manner, an increase in virtual engine rotational speed is reduced, and the requested drive wheel torque is reduced to zero.

The change in virtual accelerator operation amount to 0% is completed at time t12. In response to this, the virtual clutch operation amount is changed from the engaged operation amount to the disengaged operation amount at a predetermined rate of change. During this time, the virtual accelerator operation amount is kept at 0%, and the virtual gear stage is kept at the current Nth stage. Since the virtual accelerator operation amount, the virtual clutch operation amount, and the virtual gear stage are calculated in this manner, the virtual engine rotational speed decreases and the requested drive wheel torque is kept at zero. As the drive wheel torque decreases to zero, the acceleration that has been generated in the vehicle (acceleration in the forward direction of the vehicle) decreases.

The change in virtual clutch operation amount to the disengaged operation amount is completed at time t13. In response to this, the virtual gear stage is switched from the current Nth stage to neutral. The virtual gear stage is switched to the gear stage requested by the driver ((N+1)th stage in the example shown in FIG. 5) at time t14 when a set time has elapsed since the switching to neutral. During this time, the virtual accelerator operation amount is kept at 0%, and the virtual clutch operation amount is kept at the disengaged operation amount. Since the virtual accelerator operation amount, the virtual clutch operation amount, and the virtual gear stage are calculated in this manner, the virtual engine rotational speed continues to decrease and the requested drive wheel torque is kept at zero. The acceleration decreases to zero.

At time t15, the rotational speed difference between the virtual engine rotational speed and the virtual input shaft rotational speed ((N+1)th stage rotational speed in the example shown in FIG. 5) converges to an allowable speed difference. In response to this, the virtual clutch operation amount is changed from the disengaged operation amount to the engaged operation amount at a predetermined rate of change. During this time, the virtual accelerator operation amount is kept at 0%, and the virtual gear stage is fixed at the requested gear stage. Since the virtual accelerator operation amount, the virtual clutch operation amount, and the virtual gear stage are calculated in this manner, the virtual engine rotational speed further decreases and the requested drive wheel torque is kept at zero. Since the drive wheel torque continues to be kept at zero, the acceleration is also kept at zero.

The change in virtual clutch operation amount to the engaged operation amount is completed at time t16. In response to this, the virtual accelerator operation amount is changed from 0% to the user requested operation amount at a predetermined rate of change. During this time, the virtual clutch operation amount is fixed at the engaged operation amount, and the virtual gear stage is fixed at the requested gear stage. Since the virtual accelerator operation amount, the virtual clutch operation amount, and the virtual gear stage are calculated in this manner, the virtual engine rotational speed slightly decreases in a stepped manner when the change in virtual clutch operation amount to the engaged operation amount is completed, and then increases continuously. The requested drive wheel torque temporarily increases and decreases, and then increases continuously. Since the change in requested drive wheel torque is not immediately reflected in the acceleration, the acceleration is still kept at zero during this time.

The change in virtual accelerator operation amount to the requested operation amount is completed at time t17. The upshift that the driver requested the battery electric vehicle 100 to perform by operating the pseudo shifter 24 is thus completed. After the upshift is completed, the virtual accelerator operation amount is fixed at the requested operation amount, the virtual clutch operation amount is fixed at the engaged operation amount, and the virtual gear stage is fixed at the requested gear stage. A shift shock in the longitudinal direction occurs in the battery electric vehicle 100 at around this time, but the magnitude of the shift shock is kept low. The acceleration then changes to a magnitude according to the virtual accelerator operation amount and the virtual gear stage.

According to the above shift control, when the driver performs an upshift operation on the pseudo shifter 24, the virtual accelerator operation amount of the virtual internal combustion engine is changed from the requested operation amount to 0% that is the fully closed operation amount. Therefore, the virtual engine rotational speed will not increase in response to the operation of the accelerator pedal 22 by the driver, and the rotational speed difference between the virtual engine rotational speed and the virtual input shaft rotational speed of the virtual manual transmission will quickly converge within a predetermined range. Accordingly, even when the driver performs an upshift operation with the accelerator pedal 22 depressed, the virtual engine rotational speed will not increase suddenly and the shift time will not become long, and shifting can be completed without making the driver feel uncomfortable.

4-2. Shift Control During Downshift 4-2-1. With Blipping

Figure 6:
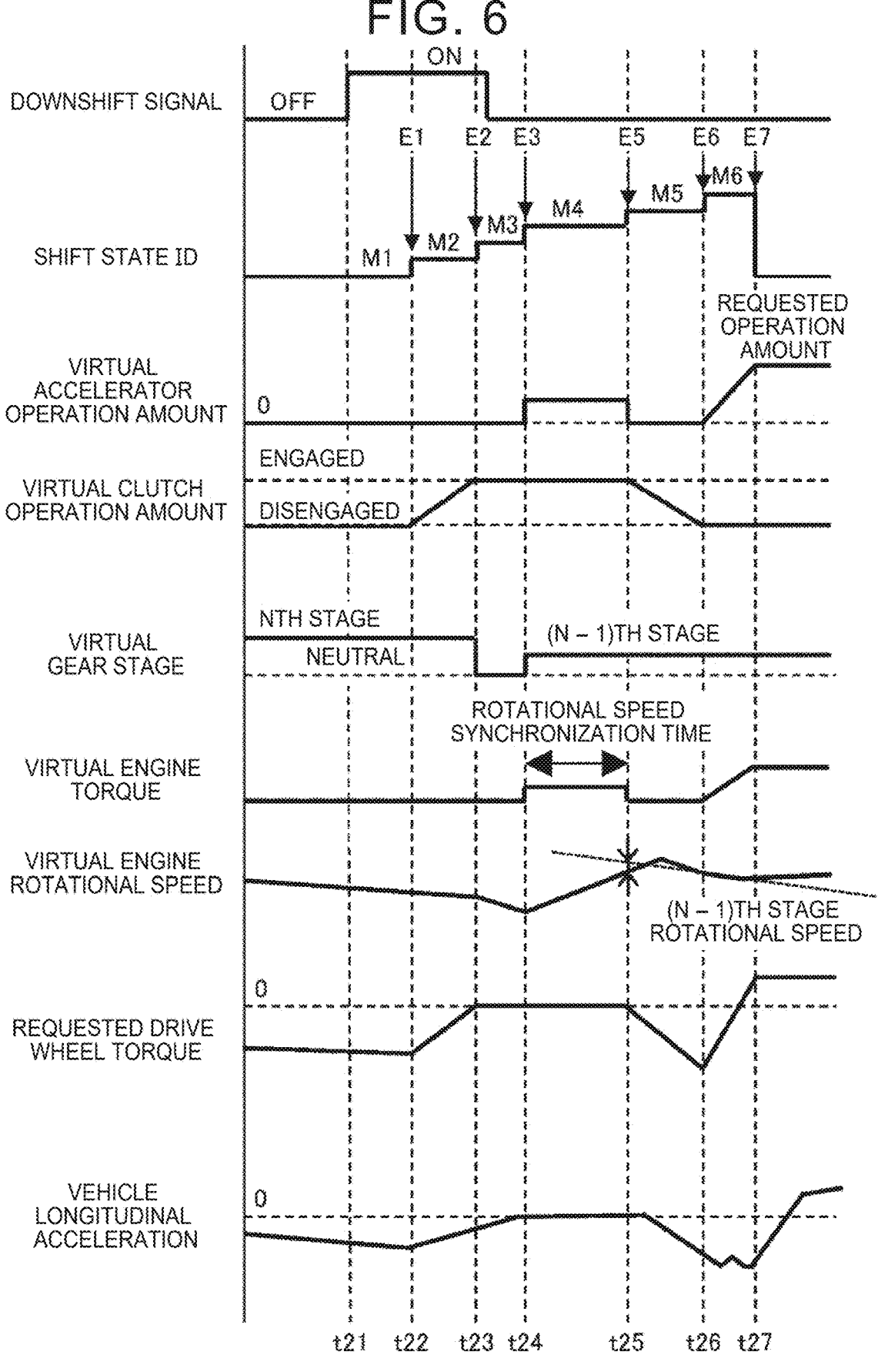
FIG. 6 shows a specific example of shift control that is performed by the control device during a downshift.

A specific example of shift control that is performed by the control device 101 during a downshift will be described with reference to FIG. 6. The timing chart shown in FIG. 6 shows, together with the shift state IDs and the transition condition IDs, the downshift signal, the virtual accelerator operation amount, the virtual clutch operation amount, the virtual gear stage, the virtual engine torque, the virtual engine rotational speed, the drive wheel torque requested for the electric motors 4F, 4R, and the change over time in longitudinal acceleration that is generated in the battery electric vehicle 100. In this specific example, blipping is used to adjust the rotational speed when engaging the virtual clutch.

According to the timing chart shown in FIG. 6, the downshift signal is input from the shift position sensor 14 to the control device 101 at time t21. In response to the input of the downshift signal, the virtual accelerator operation amount is changed from the user requested operation amount to 0% at a predetermined rate of change. In the example shown in FIG. 6, since the user requested operation amount is already 0%, the virtual accelerator operation amount is kept at 0%. During this time, the virtual clutch operation amount is kept at the engaged operation amount, and the virtual gear stage is kept at the current Nth stage. Since the virtual accelerator operation amount, the virtual clutch operation amount, and the virtual gear stage are calculated in this manner, the virtual engine torque is kept at a fixed negative value, the virtual engine rotational speed decreases, and the requested drive wheel torque increases in the negative direction.

At time t22, the virtual accelerator operation amount is confirmed to be 0%. In response to this, the virtual clutch operation amount is changed from the engaged operation amount to the disengaged operation amount at a predetermined rate of change. During this time, the virtual accelerator operation amount is kept at 0%, and the virtual gear stage is kept at the current Nth stage. Since the virtual accelerator operation amount, the virtual clutch operation amount, and the virtual gear stage are calculated in this manner, the virtual engine torque is kept at the fixed negative value, the virtual engine rotational speed decreases, and the direction of change in requested drive wheel torque changes to the positive direction and the requested drive wheel torque increases to zero. Deceleration that has been generated in the vehicle (acceleration in the rearward direction of the vehicle) changes from increase to decrease.

The change in virtual clutch operation amount to the disengaged operation amount is completed at time t23. In response to this, the virtual gear stage is switched from the current Nth stage to neutral. During this time, the virtual accelerator operation amount is kept at 0%, and the virtual clutch operation amount is kept at the disengaged operation amount. Since the virtual accelerator operation amount, the virtual clutch operation amount, and the virtual gear stage are calculated in this manner, the virtual engine torque is kept at the fixed negative value, the rate of decrease in virtual engine rotational speed increases, and the requested drive wheel torque is kept at zero. The deceleration decreases to zero.

At time t24, the time elapsed from the switching of the virtual gear stage to neutral reaches a set time. In response to this, the virtual gear stage is switched to the gear stage requested by the driver ((N−1)th stage in the example shown in FIG. 6), and the virtual accelerator operation amount is switched from 0% to a predetermined blipping operation amount. During this time, the virtual clutch operation amount is kept at the disengaged operation amount. Since the virtual accelerator operation amount, the virtual clutch operation amount, and the virtual gear stage are calculated in this manner, the virtual engine torque is increased and the virtual engine rotational speed changes from decrease to increase, but the requested drive wheel torque is kept at zero. Since the drive wheel torque continues to be kept at zero, the longitudinal acceleration is also kept at zero.

At time t25, the rotational speed difference between the virtual engine rotational speed and the virtual input shaft rotational speed ((N−1)th stage rotational speed in the example shown in FIG. 6) converges to an allowable speed difference. In response to this, the virtual accelerator operation amount is switched from the blipping operation amount back to 0%, and the virtual clutch operation amount is changed from the disengaged operation amount to the engaged operation amount at a predetermined rate of change. During this time, the virtual gear stage is fixed at the requested gear stage. Since the virtual accelerator operation amount, the virtual clutch operation amount, and the virtual gear stage are calculated in this manner, the virtual engine torque is again kept at the fixed negative value, the virtual engine rotational speed changes from increase to decrease, and the requested drive wheel torque increases in the negative direction from zero. As the drive wheel torque increases in the negative direction, the deceleration increases.

The change in virtual clutch operation amount to the engaged operation amount is completed at time t26. In response to this, the virtual accelerator operation amount is changed from 0% to the user requested operation amount at a predetermined rate of change. During this time, the virtual clutch operation amount is fixed at the engaged operation amount, and the virtual gear stage is fixed at the requested gear stage. Since the virtual accelerator operation amount, the virtual clutch operation amount, and the virtual gear stage are calculated in this manner, the virtual engine torque increases to the torque corresponding to the user requested operation amount, and the virtual engine rotational speed changes to the rotational speed determined from the requested gear stage and the vehicle speed. The direction of change in requested drive wheel torque changes from the negative direction to the positive direction. After the direction of change in requested drive wheel torque changes, a shift shock in the longitudinal direction occurs in the battery electric vehicle 100, but the magnitude of the shift shock is kept low.

The change in virtual accelerator operation amount to the requested operation amount is completed at time t27. The downshift that the driver requested the battery electric vehicle 100 to perform by operating the pseudo shifter 24 is thus completed. After the downshift is completed, the virtual accelerator operation amount is fixed at the requested operation amount, the virtual clutch operation amount is fixed at the engaged operation amount, and the virtual gear stage is fixed at the requested gear stage.

According to the above shift control, when the driver performs a downshift operation on the pseudo shifter 24, the virtual accelerator operation amount is forcibly set to 0% that is the fully closed operation amount, and blipping is performed in synchronization with switching of the virtual gear stage to the requested gear stage. Therefore, the virtual engine rotational speed will not increase in response to the operation of the accelerator pedal 22 by the driver, and the rotational speed difference between the virtual engine rotational speed and the virtual input shaft rotational speed of the virtual manual transmission will quickly converge within a predetermined range due to the blipping. Accordingly, even when the driver performs a downshift operation with the accelerator pedal 22 depressed, the virtual engine rotational speed will not increase suddenly and the shift time will not become long, and shifting can be completed without making the driver feel uncomfortable.

4-2-2. Without Blipping

Figure 7:
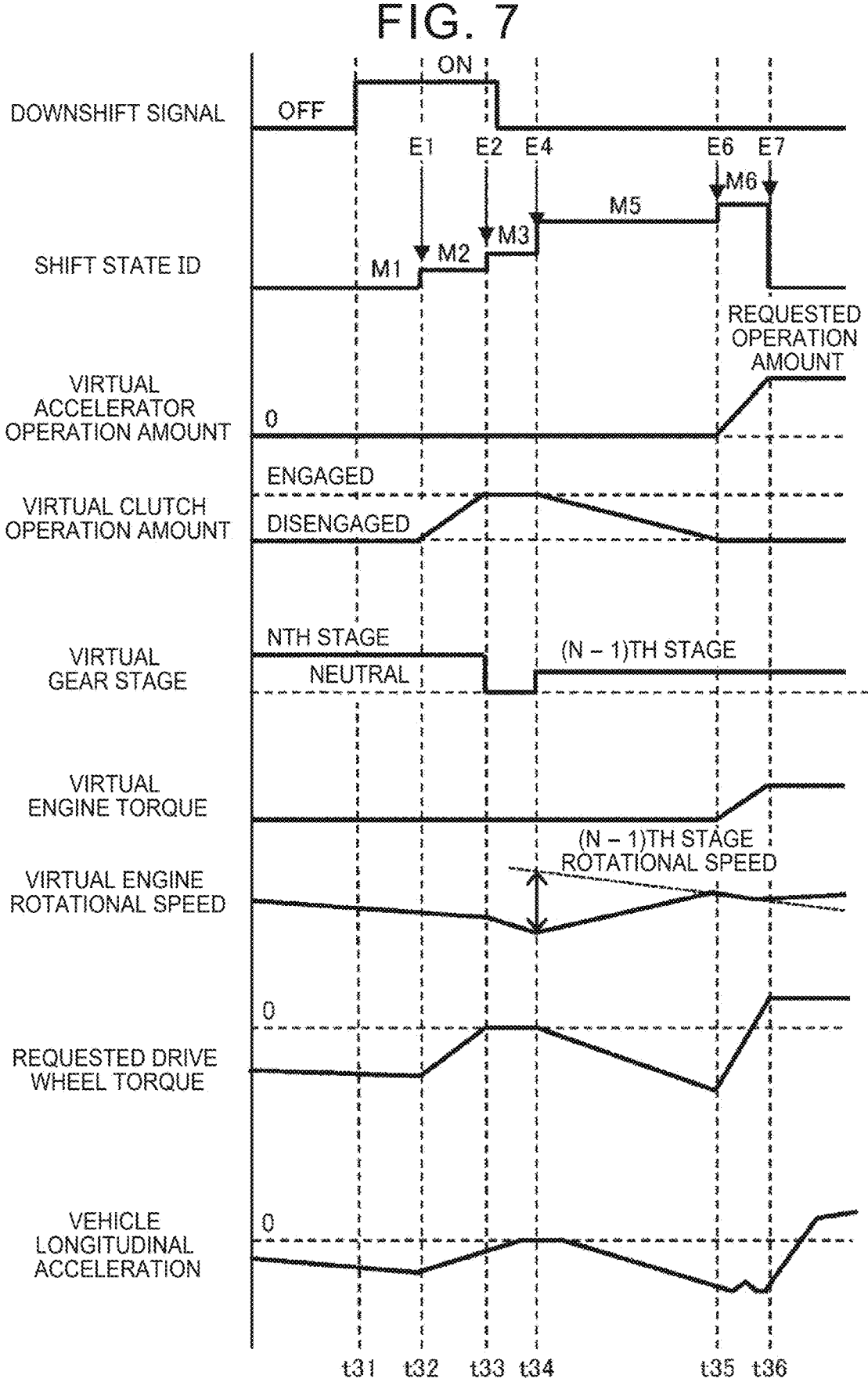
FIG. 7 shows another specific example of the shift control that is performed by the control device during a downshift.

Another specific example of the shift control that is performed by the control device 101 during a downshift will be described with reference to FIG. 7. The timing chart shown in FIG. 7 shows, together with the shift state IDs and the transition condition IDs, the downshift signal, the virtual accelerator operation amount, the virtual clutch operation amount, the virtual gear stage, the virtual engine torque, the virtual engine rotational speed, the drive wheel torque requested for the electric motors 4F, 4R, and the change over time in longitudinal acceleration that is generated in the battery electric vehicle 100. In this specific example, blipping is not used to adjust the rotational speed when engaging the virtual clutch, but a half clutch is used instead. The driver can set whether to use the shift control of this example or the shift control using blipping via the HMI 20 as desired.

According to the timing chart shown in FIG. 7, the downshift signal is input from the shift position sensor 14 to the control device 101 at time t31. In response to the input of the downshift signal, the virtual accelerator operation amount is changed from the user requested operation amount to 0% at a predetermined rate of change. In the example shown in FIG. 7, since the user requested operation amount is already 0%, the virtual accelerator operation amount is kept at 0%. During this time, the virtual clutch operation amount is kept at the engaged operation amount, and the virtual gear stage is kept at the current Nth stage. Since the virtual accelerator operation amount, the virtual clutch operation amount, and the virtual gear stage are calculated in this manner, the virtual engine torque is kept at a fixed negative value, the virtual engine rotational speed decreases, and the requested drive wheel torque increases in the negative direction.

At time t32, the virtual accelerator operation amount is confirmed to be 0%. In response to this, the virtual clutch operation amount is changed from the engaged operation amount to the disengaged operation amount at a predetermined rate of change. During this time, the virtual accelerator operation amount is kept at 0%, and the virtual gear stage is kept at the current Nth stage. Since the virtual accelerator operation amount, the virtual clutch operation amount, and the virtual gear stage are calculated in this manner, the virtual engine torque is kept at the fixed negative value, the virtual engine rotational speed decreases, and the direction of change in requested drive wheel torque changes to the positive direction and the requested drive wheel torque increases to zero. Deceleration that has been generated in the vehicle (acceleration in the rearward direction of the vehicle) changes from increase to decrease.

The change in virtual clutch operation amount to the disengaged operation amount is completed at time t33. In response to this, the virtual gear stage is switched from the current Nth stage to neutral. During this time, the virtual accelerator operation amount is kept at 0%, and the virtual clutch operation amount is kept at the disengaged operation amount. Since the virtual accelerator operation amount, the virtual clutch operation amount, and the virtual gear stage are calculated in this manner, the virtual engine torque is kept at the fixed negative value, the rate of decrease in virtual engine rotational speed increases, and the requested drive wheel torque is kept at zero. The deceleration decreases to zero.

At time t34, the time elapsed from the switching of the virtual gear stage to neutral reaches a set time. In response to this, the virtual gear stage is switched to the gear stage requested by the driver ((N−1)th stage in the example shown in FIG. 7). In this example, the allowable rotational speed difference is set to be larger than in the example using blipping. Therefore, the rotational speed difference between the virtual engine rotational speed and the virtual input shaft rotational speed ((N−1)th rotational speed in the example shown in FIG. 7) converges to the allowable speed difference at time t34. In response to this, the virtual clutch operation amount is changed from the disengaged operation amount to the engaged operation amount at a predetermined rate of change. In this example, the rate of change from the disengaged operation amount to the engaged operation amount is set to be lower than in the example using blipping in order to secure a long half-clutch period. The virtual accelerator operation amount is kept at 0% even after time t34. Since the virtual accelerator operation amount, the virtual clutch operation amount, and the virtual gear stage are calculated in this manner, the virtual engine torque is kept at the fixed negative value, but the virtual engine rotational speed changes from decrease to increase, and the requested drive wheel torque increases in the negative direction from zero. As the drive wheel torque increases in the negative direction, the deceleration increases.

The change in virtual clutch operation amount to the engaged operation amount is completed at time t35. In response to this, the virtual accelerator operation amount is changed from 0% to the user requested operation amount at a predetermined rate of change. During this time, the virtual clutch operation amount is fixed at the engaged operation amount, and the virtual gear stage is fixed at the requested gear stage. Since the virtual accelerator operation amount, the virtual clutch operation amount, and the virtual gear stage are calculated in this manner, the virtual engine torque increases to the torque corresponding to the user requested operation amount, and the virtual engine rotational speed changes to the rotational speed determined from the requested gear stage and the vehicle speed. The direction of change in requested drive wheel torque changes from the negative direction to the positive direction. After the direction of change in requested drive wheel torque changes, a shift shock in the longitudinal direction occurs in the battery electric vehicle 100, but the magnitude of the shift shock is kept low.

The change in virtual accelerator operation amount to the requested operation amount is completed at time t36. The downshift that the driver requested the battery electric vehicle 100 to perform by operating the pseudo shifter 24 is thus completed. After the downshift is completed, the virtual accelerator operation amount is fixed at the requested operation amount, the virtual clutch operation amount is fixed at the engaged operation amount, and the virtual gear stage is fixed at the requested gear stage.

According to the above shift control, when the driver performs a downshift operation on the pseudo shifter 24, the virtual accelerator operation amount is forcibly set to 0% that is the fully closed operation amount. A half-clutch is started in synchronization with switching of the virtual gear stage to the requested gear stage. Therefore, the virtual engine rotational speed will not increase in response to the operation of the accelerator pedal 22 by the driver. The rotational speed difference between the virtual engine rotational speed and the virtual input shaft rotational speed of the virtual manual transmission will quickly converge within a predetermined range due to the half-clutch. Accordingly, even when the driver performs a downshift operation with the accelerator pedal 22 depressed, the virtual engine rotational speed will not increase suddenly and the shift time will not become long. Shifting can therefore be completed without making the driver feel uncomfortable.

5. Others

The shift control during an upshift and the shift control during a downshift that are performed in the battery electric vehicle according to the present embodiment are also applicable to a battery electric vehicle equipped with a pseudo clutch pedal in addition to a pseudo shifter. When the driver desires assistance with clutch operations, operations of the pseudo clutch pedal by the driver may be disabled, and the virtual clutch operation amount calculated by the driver model may be used.

What is claimed is:

1. A battery electric vehicle including an electric motor as a driving source, the battery electric vehicle comprising:
an accelerator pedal;
a pseudo shifter imitating a shifter that is used to perform a shifting operation of a manual transmission internal combustion engine vehicle; and
a control device configured to change a relationship among a vehicle speed of the battery electric vehicle, an accelerator operation amount of the accelerator pedal, and torque of the electric motor in response to an operation of the pseudo shifter, wherein
the control device includes
a memory storing a vehicle model that models a virtual vehicle, and
a processing circuit coupled to the memory and configured to execute the vehicle model,
the vehicle model includes
an engine model that models a virtual internal combustion engine,
a clutch model that models a virtual clutch,
a transmission model that models a virtual manual transmission, and
a driver model configured to calculate a virtual accelerator operation amount of the virtual internal combustion engine, a virtual clutch operation amount of the virtual clutch, and a virtual gear stage of the virtual manual transmission, based on the accelerator operation amount, a shift position of the pseudo shifter, the vehicle speed, and a virtual engine rotational speed of the virtual internal combustion engine, and
the driver model is configured to
change the virtual accelerator operation amount from the accelerator operation amount to a fully closed operation amount in response to a change in the shift position caused by the operation of the pseudo shifter,
change the virtual clutch operation amount from an engaged operation amount to a disengaged operation amount in response to completion of the change in the virtual accelerator operation amount to the fully closed operation amount,
change the virtual gear stage to a requested gear stage corresponding to the changed shift position in response to completion of the change in the virtual clutch operation amount to the disengaged operation amount,
after the virtual gear stage is changed to the requested gear stage, change the virtual clutch operation amount from the disengaged operation amount to the engaged operation amount in response to a rotational speed difference between the virtual engine rotational speed and a virtual input shaft rotational speed of the virtual manual transmission converging within a predetermined range, and
change the virtual accelerator operation amount from the fully closed operation amount to the accelerator operation amount in response to completion of the change in the virtual clutch operation amount to the engaged operation amount.

2. The battery electric vehicle according to claim 1, wherein the driver model is configured to, when the operation of the pseudo shifter is a downshift operation, temporarily increase the virtual accelerator operation amount from the fully closed operation amount in response to completion of the change in the virtual gear stage to the requested gear stage, and change the virtual clutch operation amount from the disengaged operation amount to the engaged operation amount in response to the rotational speed difference converging within the predetermined range.

* * * * *